US009487253B2

(12) United States Patent
Behrens

(10) Patent No.: US 9,487,253 B2
(45) Date of Patent: Nov. 8, 2016

(54) STEP-CLIMBING ATTACHMENT FOR A WHEELED CHAIR

(71) Applicants: Mobility 2000 (Australia) Limited, Rose Bay (AU); University of Technology, Sydney, Broadway (AU)

(72) Inventor: Michael Behrens, Berowra (AU)

(73) Assignee: Mobility 2000 (Australia) Limited, Rose Bay (AU)

( * ) Notice: Subject to any disclaimer, the term of this patent is extended or adjusted under 35 U.S.C. 154(b) by 41 days.

(21) Appl. No.: 14/577,108

(22) Filed: Dec. 19, 2014

(65) Prior Publication Data

US 2015/0129328 A1    May 14, 2015

Related U.S. Application Data

(63) Continuation of application No. 14/004,649, filed as application No. PCT/AU2012/000109 on Feb. 7, 2012, now abandoned.

(30) Foreign Application Priority Data

Feb. 7, 2011  (AU) ................................ 2011900390

(51) Int. Cl.
*A61G 5/04*    (2013.01)
*B62D 57/02*   (2006.01)
(Continued)

(52) U.S. Cl.
CPC .............. *B62D 57/022* (2013.01); *A61G 5/04* (2013.01); *A61G 5/061* (2013.01); *A61G 5/066* (2013.01); *B62B 5/026* (2013.01); *A61G 5/042* (2013.01); *B62D 57/032* (2013.01)

(58) Field of Classification Search
CPC .... B62D 57/022; B62D 57/032; A61G 5/04; A61G 5/066; A61G 5/061; A61G 5/042; B62B 5/026
USPC ....................................................... 180/209
See application file for complete search history.

(56) References Cited

U.S. PATENT DOCUMENTS 4,245,847 A    1/1981  Knott
4,645,222 A *  2/1987  Hester .................... A61G 5/065
                                                    180/8.2

(Continued)

FOREIGN PATENT DOCUMENTS

CN        201132553 Y    10/2008
WO          0234190 A2     5/2002

OTHER PUBLICATIONS

PCT International Search Report for PCT/AU2012/000109, 6 pages.

(Continued)

*Primary Examiner* — Karen Beck
(74) *Attorney, Agent, or Firm* — Colin P. Cahoon; Celina M. Orr; Carstens & Cahoon LLP

(57) ABSTRACT

A step climbing attachment suitable for attachment to a wheeled chair is described. The step climbing attachment includes a chassis for mounting one or more ground engaging units, a first and a second ground engaging unit mounted to the chassis, at least one of the first and second ground engaging units adapted to move relative to the other of the first or second ground engaging units and the chassis, the relative movement being between a ground engaging position and a step-engaging support position so that in use at least one of the first and/or second ground engaging units engages a step.

16 Claims, 18 Drawing Sheets

(51) Int. Cl.
  *A61G 5/06* (2006.01)
  *B62B 5/02* (2006.01)
  *B62D 57/032* (2006.01)

(56) References Cited

U.S. PATENT DOCUMENTS

| | | | | |
|---|---|---|---|---|
| 5,263,547 | A * | 11/1993 | Alber | A61G 5/061 180/357 |
| 5,482,125 | A * | 1/1996 | Pagett | A61G 5/042 180/6.32 |
| 6,550,787 | B1 * | 4/2003 | Chu | A61G 5/027 180/8.2 |
| 6,845,830 | B2 * | 1/2005 | Tojo | A61G 5/046 180/8.3 |
| 7,316,282 | B2 | 1/2008 | Mulhern et al. | |
| 7,374,002 | B2 * | 5/2008 | Fought | A61G 5/043 180/65.51 |
| 7,422,079 | B2 * | 9/2008 | Hsiao | A61G 5/046 180/65.1 |
| 7,726,689 | B2 * | 6/2010 | Mulhern | A61G 5/042 180/907 |
| 7,784,569 | B2 * | 8/2010 | Cheng | A61G 5/046 180/41 |
| 8,061,460 | B2 * | 11/2011 | Scheck | A61G 5/063 180/8.1 |
| 9,010,470 | B2 * | 4/2015 | Cuson | A61G 5/06 180/65.31 |
| 2003/0168265 | A1 * | 9/2003 | Goertzen | A61G 5/043 180/65.1 |
| 2003/0183427 | A1 * | 10/2003 | Tojo | A61G 5/046 180/8.1 |
| 2004/0149499 | A1 * | 8/2004 | Kim | A61G 5/061 180/8.2 |
| 2006/0021806 | A1 * | 2/2006 | Goertzen | A61G 5/043 180/65.1 |
| 2011/0215540 | A1 * | 9/2011 | Hunziker | A61G 5/043 280/5.2 |
| 2011/0260417 | A1 * | 10/2011 | Bitzer | A61G 5/063 280/5.2 |
| 2014/0083788 | A1 * | 3/2014 | Behrens | A61G 5/04 180/209 |
| 2015/0374564 | A1 * | 12/2015 | Sutton | A61G 5/061 280/657 |

OTHER PUBLICATIONS

Wheelchair with Galileo stair climbing system on ID Magazine, downloaded Mar. 19, 2015, from http://www.id-mag.com/gallery/wheelchair-with-galileo-stair-climbing-system/4719115, 5 pages. There is also a video on this web page.

* cited by examiner

STEP-CLIMBING ATTACHMENT FOR A WHEELED CHAIR

CROSS REFERENCE TO RELATED APPLICATION

This application is a continuation application of co-pending U.S. patent application Ser. No. 14/004,649, entitled "Step-Climbing Attachment for a Wheeled Chair," filed Oct. 31, 2013, the technical disclosure of which is hereby incorporated by reference in its entirety.

FIELD OF THE INVENTION

The present invention relates generally to step climbing attachments suitable for use in a range of movable items such as for example trolleys, walkers, wheelbarrows, chairs, scooters and the like. In selected embodiments, the invention relates to wheeled chairs including wheelchairs to afford increased accessibility for infirm people and less able people.

BACKGROUND

Chairs, movable baskets and trolleys, walkers, scooters and the like are useful for carrying and moving items such as luggage, groceries, heavy items, as well as people. Some of these items may be motorised, but many versions of these devices have limitations when negotiating stairs. Some wheeled attachments are also known but involve cumbersome, large and inflexible apparatus.

Wheelchairs in particular can be very difficult to operate over uneven ground, kerbs, gutters, and, most difficult of all: staircases. This is so if the wheelchair is a manually-pushed chair but particularly so for a powered chair which uses electrical power for propulsion and steering. These latter types of chair, due to the propulsion and onboard energy storage systems are heavy and large, and known models are not easy to drive over uneven ground, and particularly, as mentioned, staircases.

The present invention provides improved step climbing attachments suitable for use with wheeled chairs and other vehicles such as wheelchairs.

DEFINITIONS

Throughout this specification and the claims that follow, the following phrases are given the meanings that a person of ordinary skill in the art would apply to them as well as the clarifications set out below.

Ground engaging position: a support position adopted by an element of an apparatus described herein wherein the element abuts a portion of open ground, usually from above to rest on the open ground to support at least some of the mass of a movable item, such as for example a chair.

Step engaging position: a position adopted by an element of the apparatus described herein wherein the element abuts or engages a tread portion of a step so as to support at least some of the mass of a moving item, such as for example a chair.

SUMMARY OF INVENTION

According to one aspect of the present invention there is provided a step climbing attachment suitable for facilitating the negotiation of irregular pathways, road and open ground and suitable for use with a wheeled chair, the step climbing attachment including:

a chassis adapted to mount to a base region of the wheeled chair;

at least a first and a second ground engaging unit operatively mounted to the chassis, at least one of the first and second ground engaging units adapted to move relative to the other of the first or second ground engaging units and the chassis, the relative movement being between a ground engaging position and a step-engaging position.

There are optionally provided several different alternative arrangements, including wholly passive arrangements, where the support assemblies are pushed into step engagement positions by the momentum of, for example, a chair to which it is attached, to semi-passive arrangements, where the support assembly is not self-propelled but motors elevate the ground engaging units into a step engaging position, to fully powered arrangements where both ambulation and stepping is accomplished by motors. Other combinations are also possible, such as self-propelled but passive stepping arrangements.

Semi-Passive Arrangements (Castor Wheels)

The ground engaging units may be arranged in any suitable way including where the ground engaging units include one or more posts, sleds, skids and/or wheel assemblies. In a preferred embodiment, the first and second ground engaging units are wheel assemblies and each includes ground engaging castor wheels. In one example embodiment the ground engaging castor wheels include a hub for rotating a main castor wheel body thereabout. The hub may include any suitable arrangement, including a typical central rotating axle or a rotating peripheral or circumferential hub, wherein a peripheral or annular tyre or outer wheel assembly is mounted on a bearing race and rotates about a disc wheel body.

The chassis itself may have an integral ground engaging portion. Optionally, however, the chassis includes a mounting assembly to mount the first and second ground engaging units to the chassis so that one or more of the ground engaging units can engage the ground rather than the chassis itself. Movement of the mounting assembly to move the ground engaging units may be a vertical, horizontal, extension, rotating about a yaw axis, or pivoting movement about a horizontal axis or a combination of one or more of those movements.

In a preferred embodiment the mounting assembly includes a pivoting element so that the ground engaging units and/or chassis in use are rotated or swung about a horizontal axis and in so doing the ground engaging units are swung between the ground engaging support position and the step-engaging support position.

Optionally the pivoting element includes at least one link arm which extends between a chassis end mounted to a chassis mounting point; and a wheel end mounted to a wheel or ground engaging unit mounting point. Optionally the wheel end of the link arm is rotatably mounted to the wheel or ground engaging unit to rotatably mount the link arm to the wheel or ground engaging unit.

The wheel end of the or each link arm is optionally eccentrically mounted to the ground engaging unit, however, it may be mounted to the centre of the ground engaging unit if the latter has a centre, such as for example when the ground engaging unit is in the form of a wheel. The chassis end may be mounted to the chassis at a position remote from the wheel's centre of rotation, and is optionally outside the circumference of the wheel.

In a preferred embodiment the link arms are in the form of linkages so that the wheel may be moved and controlled by being mounted at one of the linkage joints. In one embodiment the centre of rotation of the wheel can be moved outside the wheel itself. Optionally, a first linkage is in the form of a four bar linkage wherein first and second links are pivotally mounted at spaced-apart locations on the chassis, the first link being disposed lower than the second link. A third link is in the form of one of the wheels, and the fourth link is formed by the chassis itself, in typical four-bar link fashion. Optionally the first link is shorter than the second link so as not to jam when in operation. Optionally the second link includes a spring and/or damper arrangement to provide a suspended chassis.

Optionally a motor and gearbox is mounted within the wheel for pivoting of the ground engaging units into a step engaging position.

The wheel hub optionally connects to a distal end of the first link. Optionally a gearbox outlet is disposed at this connection.

A motor plate is optionally provided and optionally mounts to a distal end of the second link. The motor plate extends over the tread of the wheel rim and tyre and mounts to an outboard side of the wheel at its centre.

Optionally one or other of the ground engaging units is disposed in use on the chassis in a position relatively forward of the other ground engaging units so as to facilitate step climbing or descending.

Optionally one or more motors are provided to rotate the links or linkages so that the ground engaging units can be quickly and accurately positioned above or on the step tread. Optionally the motor and links and linkages are adapted to be strong enough to lift or lower its proportion of the mass of the chair when in use. The link arm may be integral with a disc main wheel body.

Optionally the chassis is disposed between two wheels.

Optionally the chassis includes a swivel mount so that the chassis may swivel about a yaw axis, either passively or actively under control of a control system and motor to be turned or steered in response to operator input. Optionally the swivel mount is in use disposed forward of the link arm pivot mounts for increased stability under forward motion.

Optionally the first and second ground engaging units or wheels, and chassis are independently relatively movable and operable. Optionally this independent operation is under power of separate drive motors.

Self-Propelled Step-Climbing Arrangements

In one arrangement, the first ground engaging unit is a powered wheel assembly in that it can provide propulsion to a chair or trolley. In that arrangement, though it could be employed in other non-powered arrangements, the second ground engaging unit is in the form of a planetary wheel assembly which is mounted so as to orbit the first powered wheel assembly. An idler wheel is optionally provided and is disposed to be in contact with the tread of the powered wheel assembly, and in operation is in contact with the first and second wheels for additional support and to change the direction of rotation of the second planet wheel or ground engaging unit.

Optionally one or more brackets are provided to support the planet wheel radially outwardly relative to the first powered wheel. A proximal end of the or each bracket is in this embodiment engageable to the hub assembly or chassis assembly so that the planet wheel rotates at a similar rotational speed to the first powered wheel. Optionally the second wheel assembly moves into the step-engaging position relatively higher or lower than the ground engaging position.

In some preferred embodiments the same bracket or a further provided different bracket support the idler wheel at its radially outward disposition relative to the front powered wheel.

In operation the planetary wheel may itself run on the ground and be powered by the first powered wheel, through the idler wheel.

Optionally there are provided two planetary wheels—one disposed generally at the front and one disposed generally at the rear of the powered wheel.

Another arrangement for a self propelled stair climbing wheel optionally uses the wheelchair drive motor for propulsion and climbing so that a separate dedicated motor is not required for stair climbing. A belt may be used, stretched between a large and small pulley, or the other arrangement abovedescribed could be used.

In an alternative arrangement, the gearbox provided may be a variation of a standard two stage planetary gearbox. Thus, a first stage includes a first gear forming the sun gear, second gears forming the planetary gears, and an outer ring forming an annular gear. A spider is provided which also acts as the sun gear for a second stage. A third set of gears disposed adjacent the first stage may be provided which are in the form of planet gears and a solid ring acts as an annular gear of the second stage and is fixed to a frame of the wheeled chair. A wheel arm may be provided which forms the spider for the second stage and is the output of the gearbox. A tyre may be connected to the annular gear of the first stage so that it forms the driven or propelled wheel.

When the geared arrangement described above is in operation, the first stage annular gear is fixed to the wheeled chair, for example, using a brake, and under power, the wheel arm then rotates with respect to an input shaft with a ratio of between 4:1 and 12:1; the tyre will be fixed in position.

For driving or propulsion mode, the first stage annular gear (and tyre) are released and the first stage spider is fixed instead, the wheel arm remains fixed and the annular gear and tyre rotate with a ratio of −1:1 which is a substantially similar speed but in an opposite direction.

In this geared embodiment the gear arrangement enables the same result as using two clutches and two brakes to isolate and engage the wheel arm and tyre but only requires two brakes.

In one of the Castor Wheel, Power Wheel, or Manual Wheel arrangements or one of the Powered Wheel Arrangements for a Manual Wheel, the axle of a wheel can be operatively mounted to, or can be integral with the chassis of the support attachment.

In another embodiment there is provided a step climbing arrangement for a powered or even unpowered wheel which includes a rotating chassis which includes two spaced-apart pulleys and between which is mounted a track extending in an endless loop between the two spaced-apart pulleys. One of the pulleys includes the geared arrangement as described above and the other pulley is smaller than the other of the pulleys. The track in use propels the chair along the ground and when a step is encountered, the chassis is rotated so as to elevate the small pulley, and the track propels the chair up the steps, the track simply allowing the chair to propel itself up an incline rather than flat terrain. The track is in some optional embodiments a rubber loop or tyre.

The geared arrangement described above and the differential may be incorporated so as to facilitate climbing up the stairs, since it selects a lower gear.

In accordance with an alternative arrangement of the present invention there is provided a step climbing attachment for a wheeled chair, the step climbing arrangement including a chassis, a first pulley, and a second pulley spaced from the first pulley, and a track extending between the pulleys, wherein the chassis is rotatable so that in use the track can be inclined for the chair to ascend a staircase.

In accordance with another aspect of the present invention there is provided a wheeled chair suitable for negotiating irregular ground including stairs, the wheeled chair including at least one step climbing attachment, the step climbing attachment including:

a chassis adapted to mount to a base region of the wheeled chair;

at least a first and a second ground engaging unit operatively mounted to the chassis, at least one of the first and second ground engaging units adapted to move relative to the other of the first or second ground engaging units and the chassis, the relative movement being between a ground engaging position and a step-engaging position.

In accordance with yet another aspect of the present invention there is provided a control system for controlling a step climbing unit attached to a wheeled chair and including a chassis and a first and a second ground engaging assembly mounted to the chassis, the control system being configured to: move the first ground engaging assembly together with or separately from the second ground engaging assembly, the movement being relative to one another or the chassis, the movement further being such that the first or the second ground engaging assembly moves between a ground engaging position and a step-engaging position; the control system further being configured to extend, lift or lower the ground support chassis through a height equal to a height or drop of the step.

In accordance with still another aspect of the present invention there is provided a method of negotiating a step with a wheeled chair, the method including the steps of: mounting a first ground engaging assembly and a second ground engaging assembly to a support chassis; moving at least the first ground engaging assembly relative to the support chassis and/or second ground engaging assembly between a ground engaging position and a step-engaging position; extending, lifting or lowering the support chassis through a height equal to a height or depth of the step.

In accordance with a yet further aspect of the present invention, there is provided a computer program product for configuring a control system to control a step climbing attachment unit attached to a wheeled chair, the computer program product configuring the control system to negotiate a step by: causing the movement of a first ground engaging assembly or a second ground engaging assembly, the movement being relative to the other ground engaging assembly or a chassis to which the first and second ground engaging assembly are directly or indirectly attached, the movement further being such that the first or the second ground engaging assembly move between a ground engaging position and a step-engaging position; and extending, lifting or lowering the ground support chassis through a height equal to a height or drop of the step.

According to a yet further aspect of the present invention there is provided a kit of parts for modifying a wheeled chair to negotiate steps and irregular ground, the kit of parts including a step climbing attachment suitable for facilitating the negotiation of irregular pathways, road and open ground and suitable for use with a wheeled chair, the step climbing attachment comprising:

a chassis adapted to mount to a base region of the wheeled chair, the chassis further adapted for operatively mounting one or more ground engaging units;

at least a first and a second ground engaging unit operatively mounted to the chassis, at least one of the first and second ground engaging units adapted to move relative to the other of the first or second ground engaging units and the chassis, the relative movement being between a ground engaging position and a step-engaging position.

According to a still further aspect of the present invention there is provided a method of modifying a manual wheelchair or a one, two, three, four or more wheel drive self-propelled wheelchair or scooter so that it negotiates undulating or uneven ground or steps, the method including providing a step climbing attachment suitable for facilitating the negotiation of irregular pathways, road and open ground and suitable for use with a wheeled chair, the step climbing attachment including:

a chassis adapted to mount to a base region of the wheeled chair;

at least a first and a second ground engaging unit operatively mounted to the chassis, at least one of the first and second ground engaging units adapted to move relative to the other of the first or second ground engaging units and the chassis, the relative movement being between a ground engaging position and a step-engaging position;

and connecting the step climbing attachment to the wheeled chair.

Optionally the control system controls the relative movement of the first and second ground engaging units. Optionally the control system includes hardware and software architecture such as a processor, memory means, storage means, input/output devices and like suitable peripherals.

Optionally the control system is adapted to receive inputs from suitable input units, in response to which the control system may make selected adjustments to the relative movement of the first and second ground engaging units.

Optionally the input units include step-detectors or detectors for detecting variations in ground surface level, such as lasers, radars, light beams, ultrasound units, or the like. Further optional inputs include receivers to receive inputs from radio-transmitters or other networks such as the internet or other control signals.

Furthermore, optional electronics, modules and/or input units may be provided so as to provide position control information regarding the chassis height, or wheel or skid rotation or movement or extension to the processor. These units may include, for example, encoder units, transducer units, either linear or rotational, and the like.

Optionally the circuits are powered circuits with a voltage of 24V DC, however it will be appreciated that other voltages would be suitable. Optionally compact and electrically commutated electric motors are provided to power the preferred eccentric and independent rotation of each wheel. Optionally a motor driver is provided to provide an independent speed and direction control for each motor. The motor driver also allows motor terminals to be shorted to increase locking ability when not in use. Optionally a microcontroller decodes the encoder output and provides speed and direction signals to the motor driver and communicates with the wheelchair control system for the self-propelled wheelchair.

Optionally the motors are of a form which fits into a space envelope provided by the castor wheel. Optionally these motors include compact gearboxes such as harmonic drives and/or gearboxes and integral encoders.

Optionally slip rings are included for power lines to allow continuous rotation of the castor wheel. Optionally the control apparatus or mechanism or electronic system also controls the attitude and height of the chassis and support unit. This control could be achieved by either driving the castor axles directly or providing a second joint over the wheel contact point.

In one arrangement, a passive mechanism may be included which is not powered but which may use a spring or other device to use momentum associated with pushing a chair or trolley, and the impact associated with contact with a step to move the first and/or second ground engaging units or wheels and ultimately the chassis into a step engaging position, either simultaneously or consecutively.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention before the priority date of each claim of this specification.

In order that the present invention may be more clearly understood, example embodiments will be described with reference to the following drawings.

DETAILED DESCRIPTION OF A PREFERRED EMBODIMENT OF THE INVENTION

Passive or Idle Castor Wheel Arrangement

Figure 3:
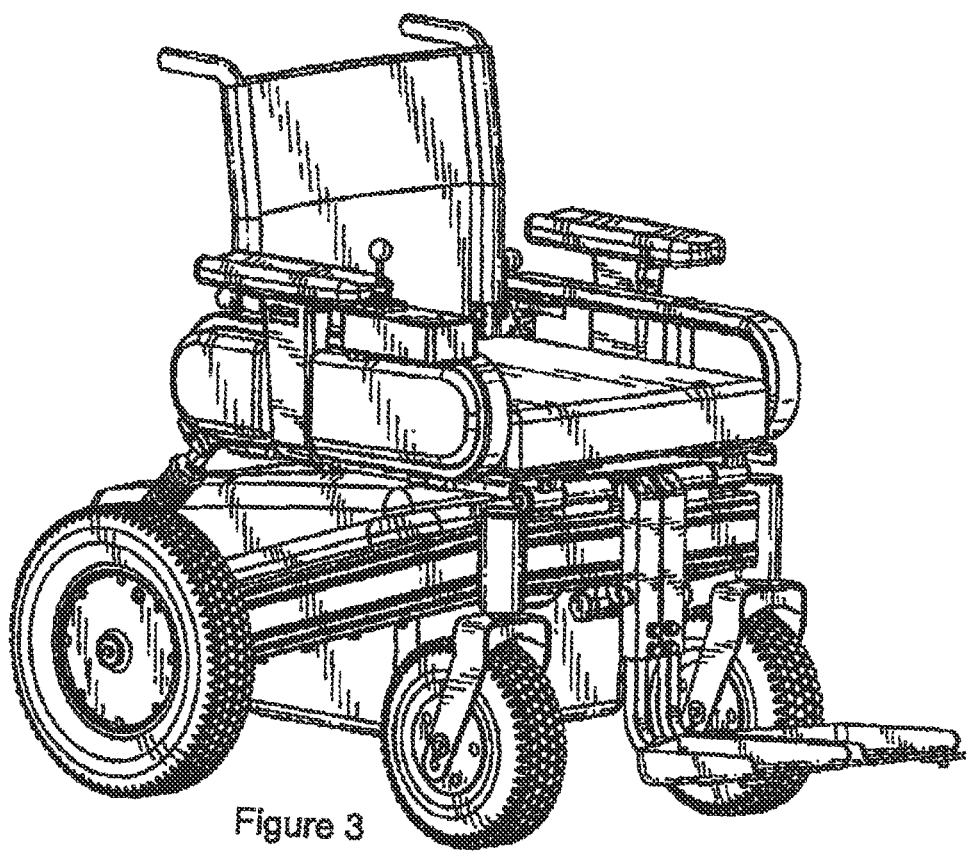
FIG. 3 is an isometric view of a wheeled chair which is in accordance with an embodiment of the present invention, the wheeled chair being adapted to receive the first and second embodiments of the present invention shown in FIGS. 1 and 2.
Figure 4:
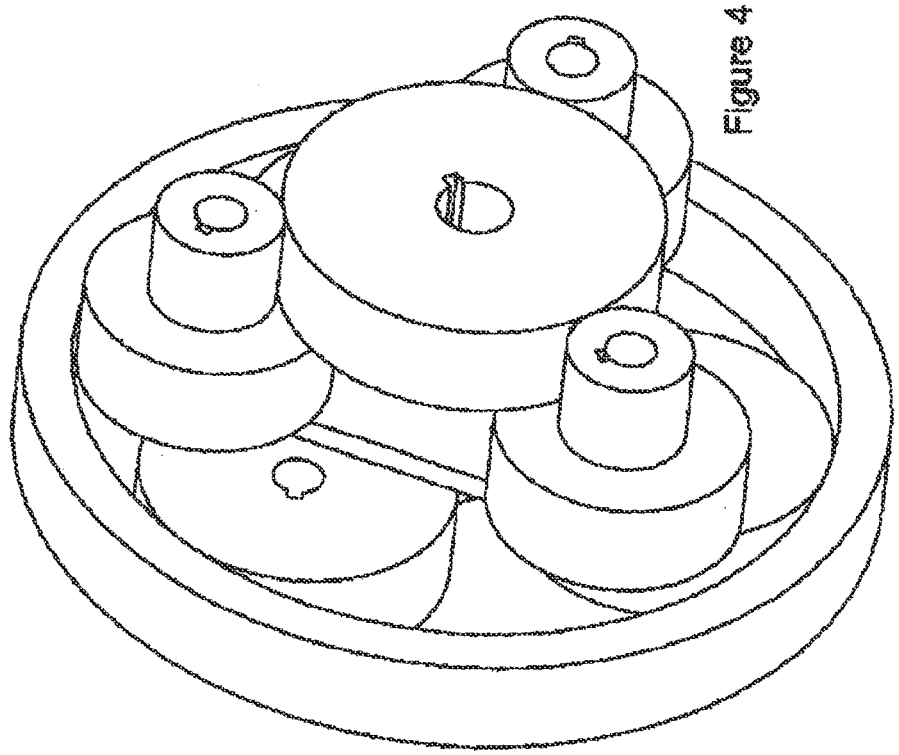
FIG. 4 is an isometric view of a portion of the geared mechanism shown in FIG. 2.
Figure 5:
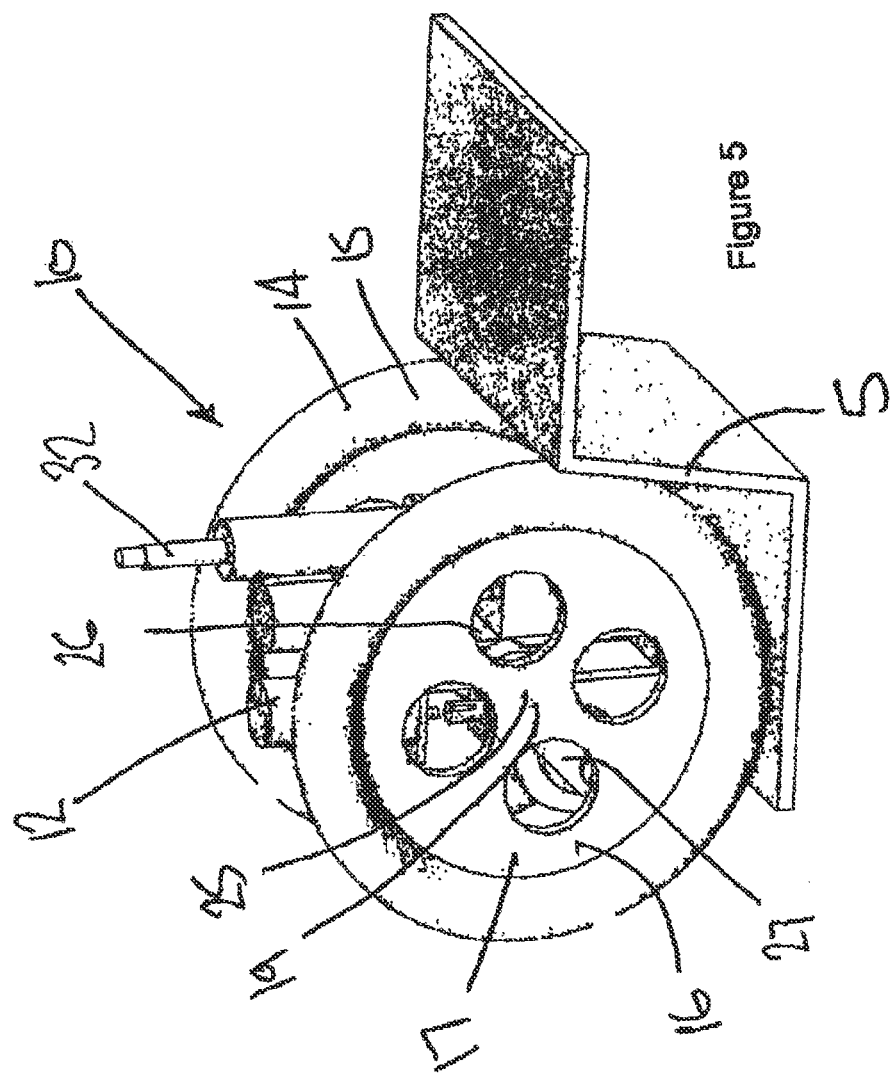
FIG. 5 is an isometric view of a step climbing attachment according to a third embodiment of the present invention, the step climbing attachment being disposed at a base of a step.

Referring to FIGS. 5 to 9 there is shown a step climbing attachment generally indicated at 10, the step climbing attachment 10 suitable for attachment to a wheeled chair or wheelchair (FIG. 3) or other wheeled or movable item such as a scooter, trolley or the like. The step climbing attachment includes a chassis 12 for mounting a first ground engaging unit 14 and second ground engaging unit 16. The first and second ground engaging units 14, 16, are in the form of castor wheel assemblies 15, 17, however, they could be in the form of skids, sleds, posts or the like.

The castor wheel assemblies 15, 17 include hubs 18, 19 for passive rotation of a main castor wheel body 20, 22 thereabouts. The hubs 18, 19 include a central axle assembly 24, 25. Connected to the hub is a link arm 26, 27, extending between a chassis end 28 and wheel axle end 29. The link arm 26, 27 is rotatably connected with bearings at both its ends to allow rotation of an element to which it is connected. The chassis end 28 of the link arm is mounted to the chassis at a position remote from the wheel axle end 29, the latter of which is disposed at the wheel's central axis.

The points of rotation for the chassis end of the link arms 26, 27 are remote from the centre of rotation of the wheel 20, 22 and are as shown in the Figures, wherein the rotation point 30 for the first ground engaging main wheel body 20 is forward of the rotation point 31 for the second ground engaging main wheel body 21 so as to provide additional reach for the attachment 10.

The chassis 12 includes a mounting point 32 in the form of a pivot stub axle 33 so that the attachment may passively rotate about a yaw axis, about the axle 33. An alternative arrangement includes steering or powered yaw rotation control for the axle 33.

Passively rotating main link arms is contemplated as an option. However, in the preferred embodiment shown, motors 35 and gearboxes 34 are provided in order to rotate the link arms 26, 27. The motors 35 may be hydraulic or, as is preferred, they are electric, and disposed fore and aft in use.

A connection or mechanism is contemplated as an option to join the motion of the link arms 26, 27. However, in the preferred embodiment shown, the link arms 26, 27 in use are independently controlled and moved.

A control system (not shown) is provided to control the independent motion of the two link arms 26, 27. The control system moves the arms either automatically, in response to inputs from sensors, encoders 90 or manually by other input devices such as control joysticks. The control system includes a software product which operates the link arms according to a method hereindescribed.

In the different embodiments shown in the Figures, like numerals denote like parts. For example, 10, 110 and 210 show different embodiments of the same conceptual wheeled attachment, and so on.

One difference between the concepts shown in FIGS. 5-9 and 12-15, is that the one in FIGS. 12-15 includes rotating circumferential tyres 40, 42 on a stationary hub 118, 119. This tends to reduce the annular thickness of the main wheel body 120 required.

Another difference between the embodiments described in FIGS. 5-9 and FIG. 1 and FIGS. 12-15 is that the links are in the form of four-bar linkages, and the motors 135 are mounted on the wheels 120. The first link, 126, is in the form of a short arm and is connected rigidly to plate 126A. The second link 127 is pivotally connected to the top of the chassis spaced from the first link 126. The second link is also pivotally connected to the third link, 128, and the third link may also be considered the wheel hub, so that the motor 135 and link 128 are rigidly connected together. The chassis may be considered the fourth link as in all four bar mechanisms.

The second link 127 also includes a suspension device, including a spring and damper 129.

Self-Propelled Wheel Arrangement

Figure 9:
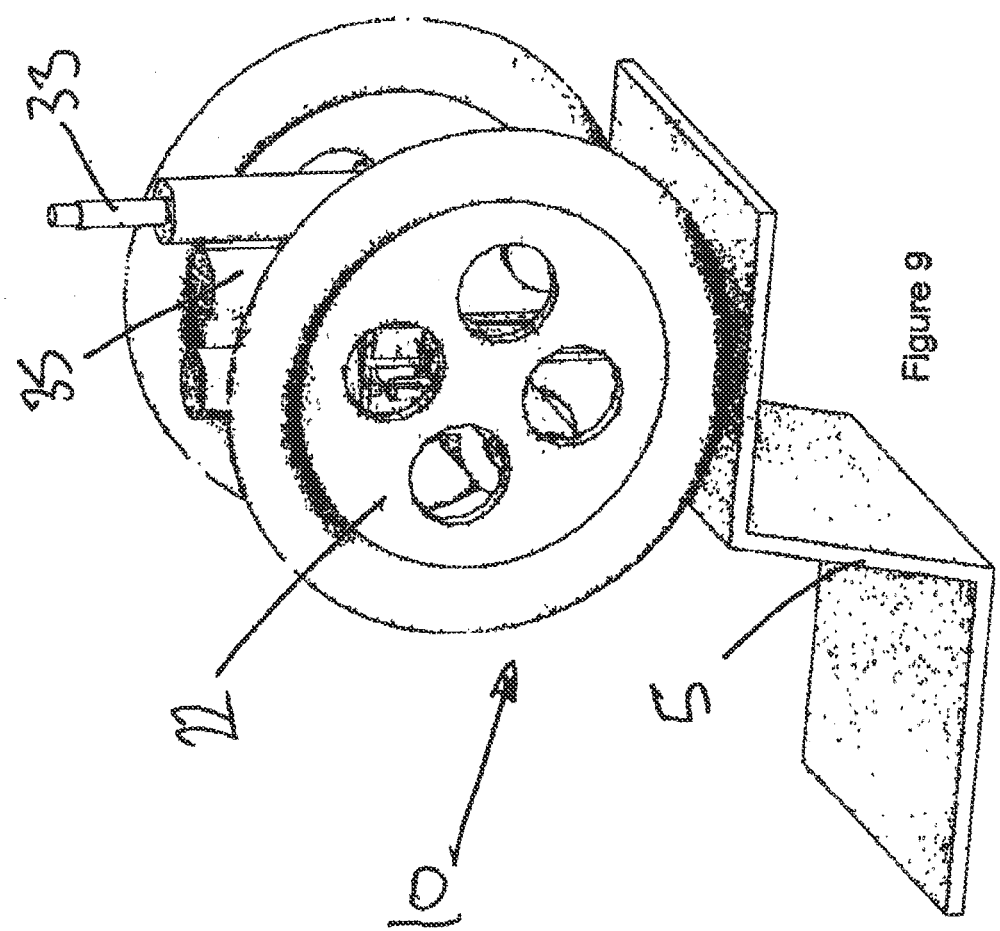
FIG. 9 is an isometric view of the step climbing attachment of FIG. 5, both wheels engaging the step.
Figure 10:
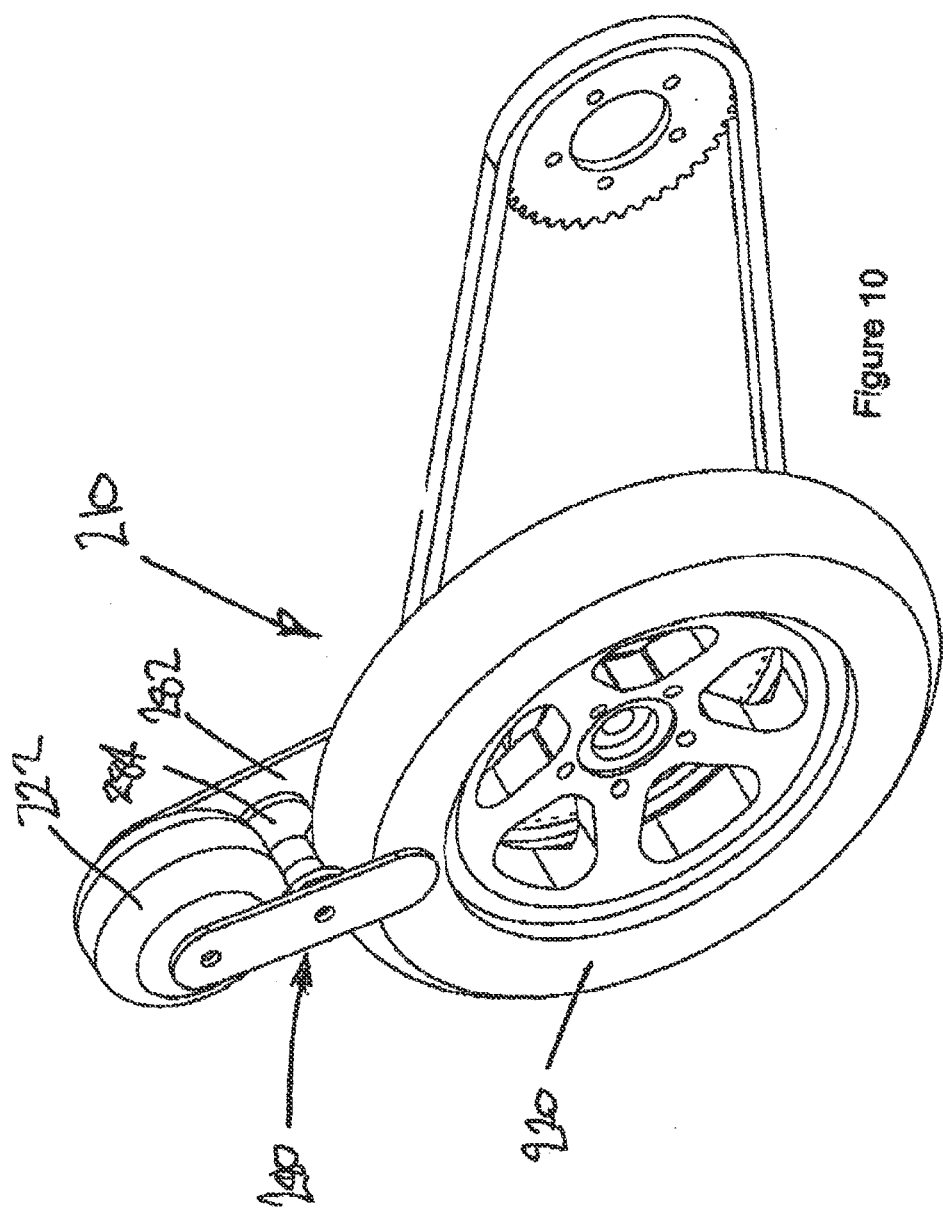
FIG. 10 is an isometric view of a step climbing attachment in accordance with another embodiment of the present invention.
Figure 11:
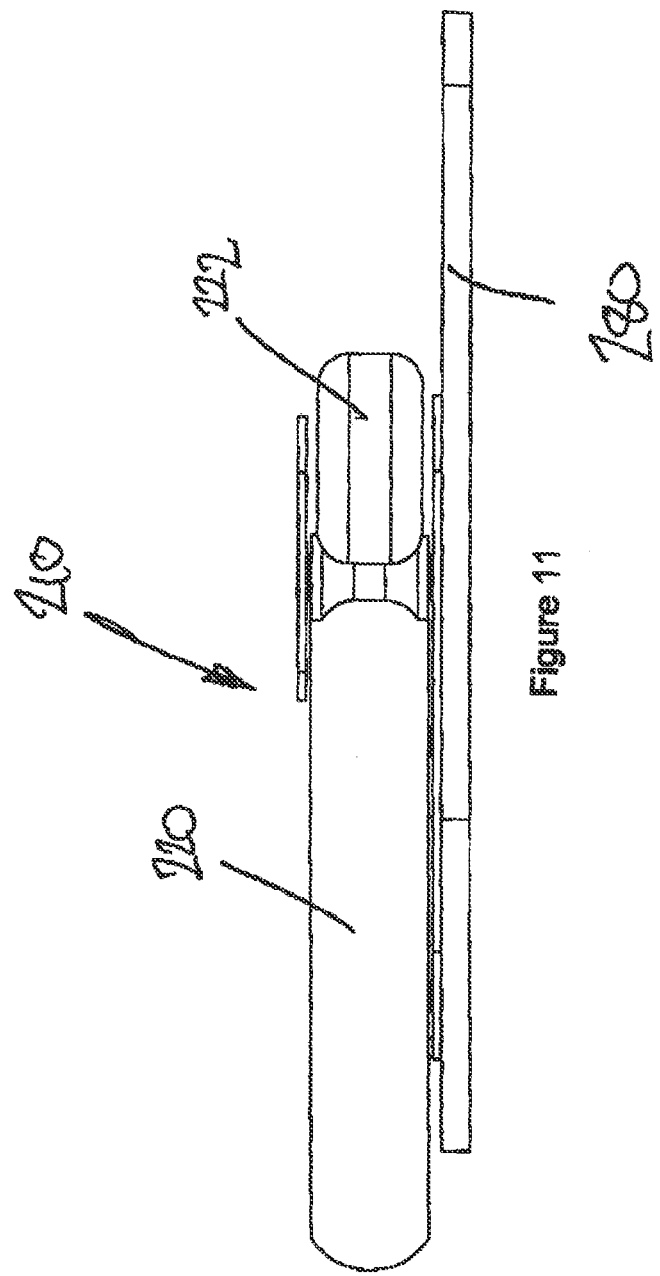
FIG. 11 is a plan view of the step climbing attachment of FIG. 10.
Figure 12:
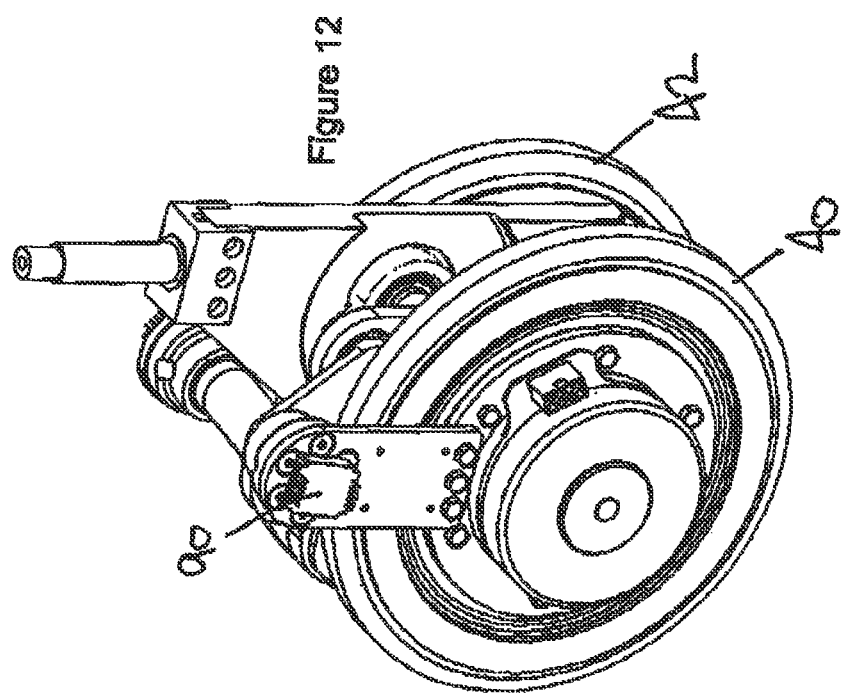
FIG. 12 is an isometric view of a step climbing attachment in accordance with another embodiment of the present invention.
Figure 13:
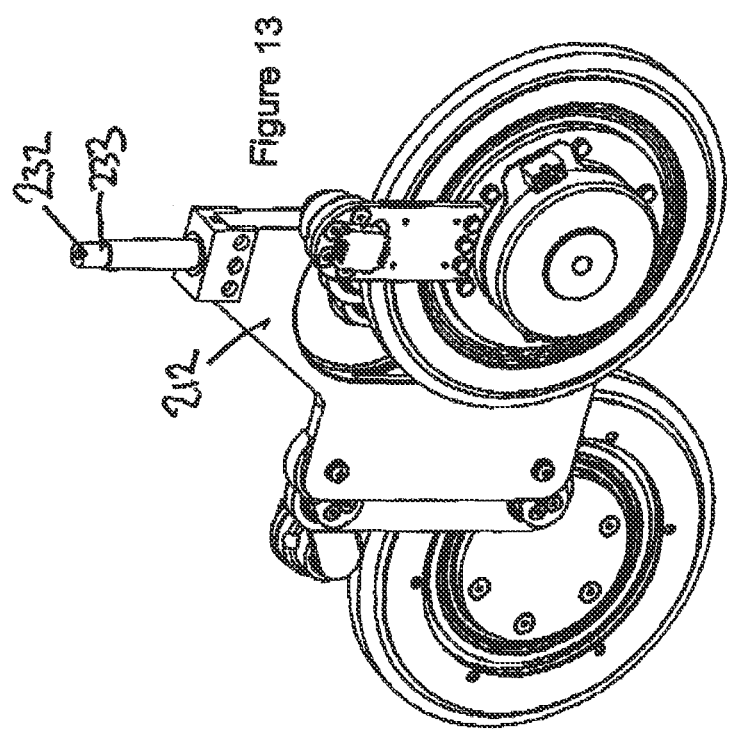
FIG. 13 shows the embodiment of FIG. 12 in a step engaging position.
Figure 14:
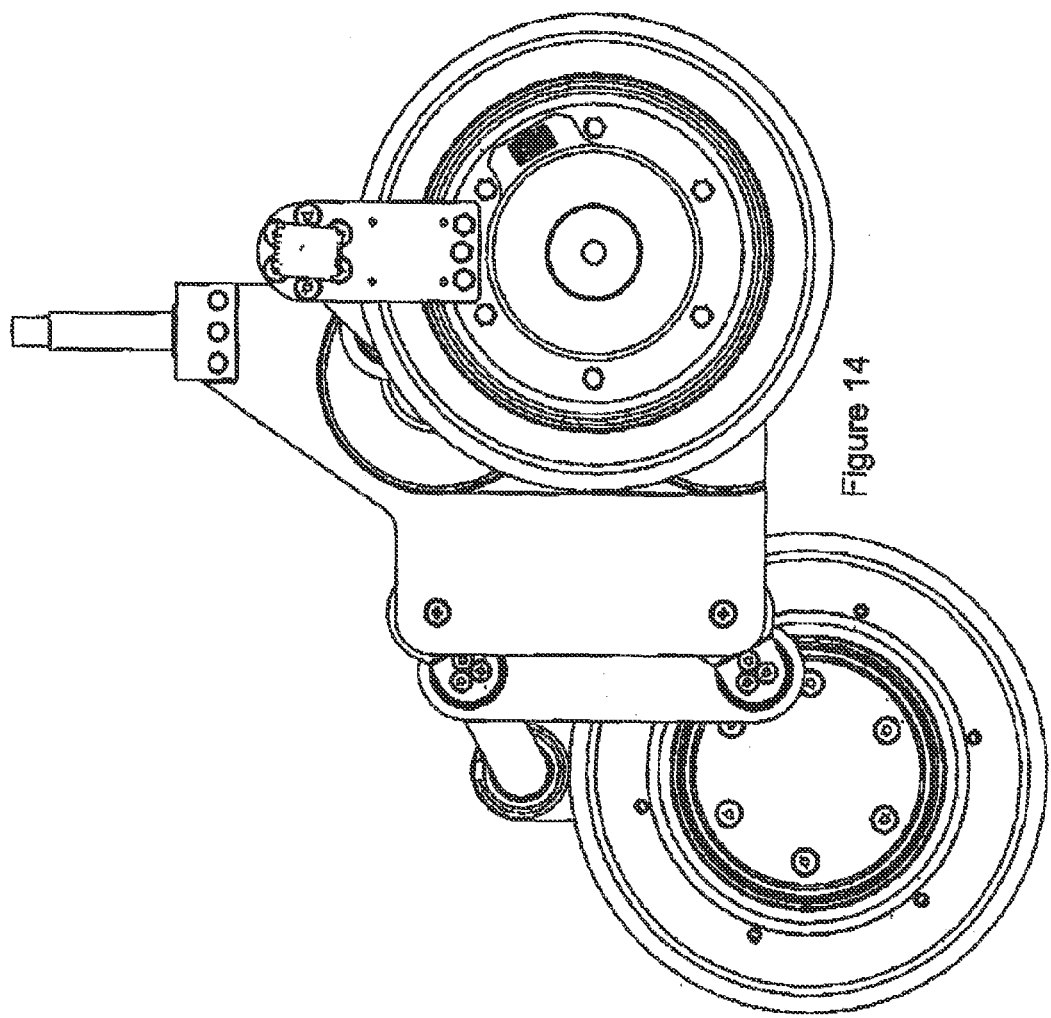
FIG. 14 shows the embodiment shown in FIG. 13 in a side elevation view.
Figure 15:
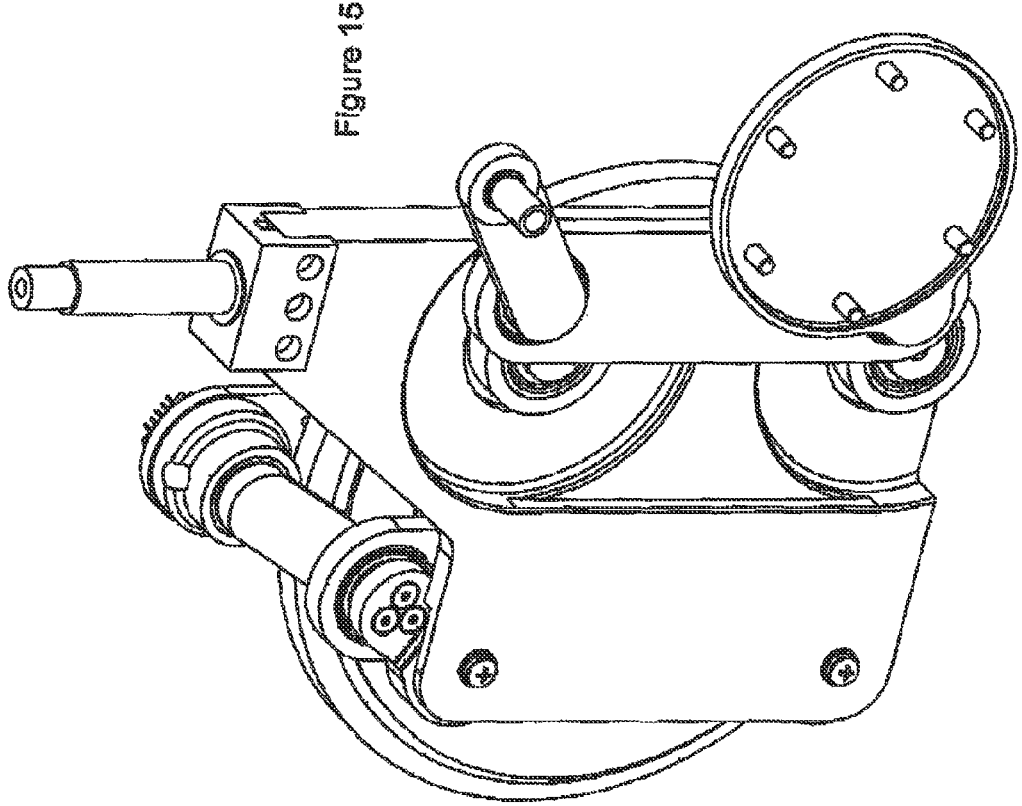
FIG. 15 is an isometric view of the embodiment of the present invention shown in FIGS. 12-14 with some items removed for clarity.
Figure 16:
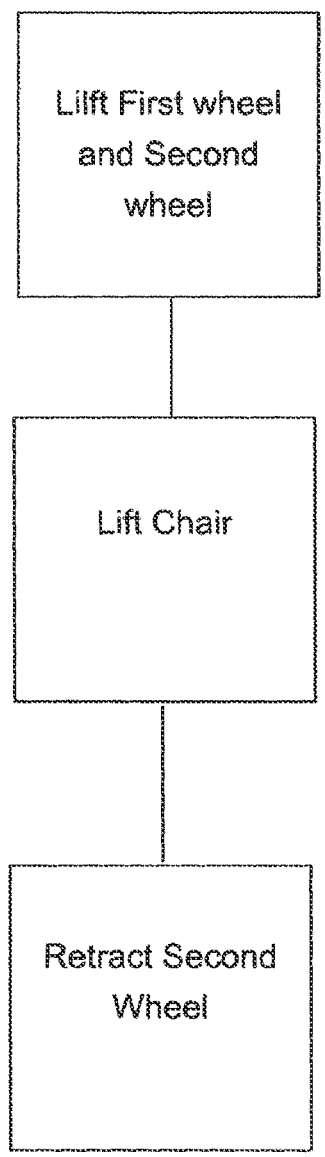
FIG. 16 is a flow diagram of an example method of step climbing with an embodiment of the present invention.

The arrangement shown in FIGS. 9, 10 and 11 includes a first ground engaging unit 214 in the form of a self-propelled or powered main wheel body 220, and a second ground engaging unit 216 in the form of a secondary wheel 222 which is mounted on a planetary drive arrangement 280. The planetary drive arrangement 280 includes a support bracket 282 upon which is mounted an idler wheel 284 and the secondary wheel 222.

In some arrangements the planetary drive arrangement 280 may include a locking mechanism (not shown) which can be selectively locked to the rotation of the main wheel body 220 to passively lift the main wheel body 220 up into a step engaging position to engage one or more steps. The locking mechanism may include a friction device, a cog, dog arrangement, chain and sprocket or like means.

In other arrangements the rotation of the planetary drive arrangement may be powered by a dedicated actuator, to provide a drive force between the bracket and chassis, or bracket 282 and main wheel body 220.

A differential gear system may be provided so that when the main wheel body 220 is in a ground engaging position and is being powered along the ground unobstructed, the differential gear system transfers power to the drive wheel. When in use the main powered wheel 220 is obstructed by one or more steps, the differential gears transfer power to the support bracket 282 so that the secondary wheel 222 is moved to a step-engaging position and then lifts the main wheel body 220 up the step and into its own step-engaging position.

The planetary drive arrangement may also include springs, dampers and other mechanisms to facilitate climbing and lowering, up and down steps respectively.

The secondary wheel 222 may be used as a ground engaging wheel upon which to drive a wheelchair along the ground in an elevated position.

Other Castor Wheel Arrangements

The four-bar mechanism advantageously provides upright orientation of the wheels during extension and a greater lifting strength.

The wheel hub optionally connects to a distal end of the first link. A gearbox outlet is disposed at this connection.

Figure 2:
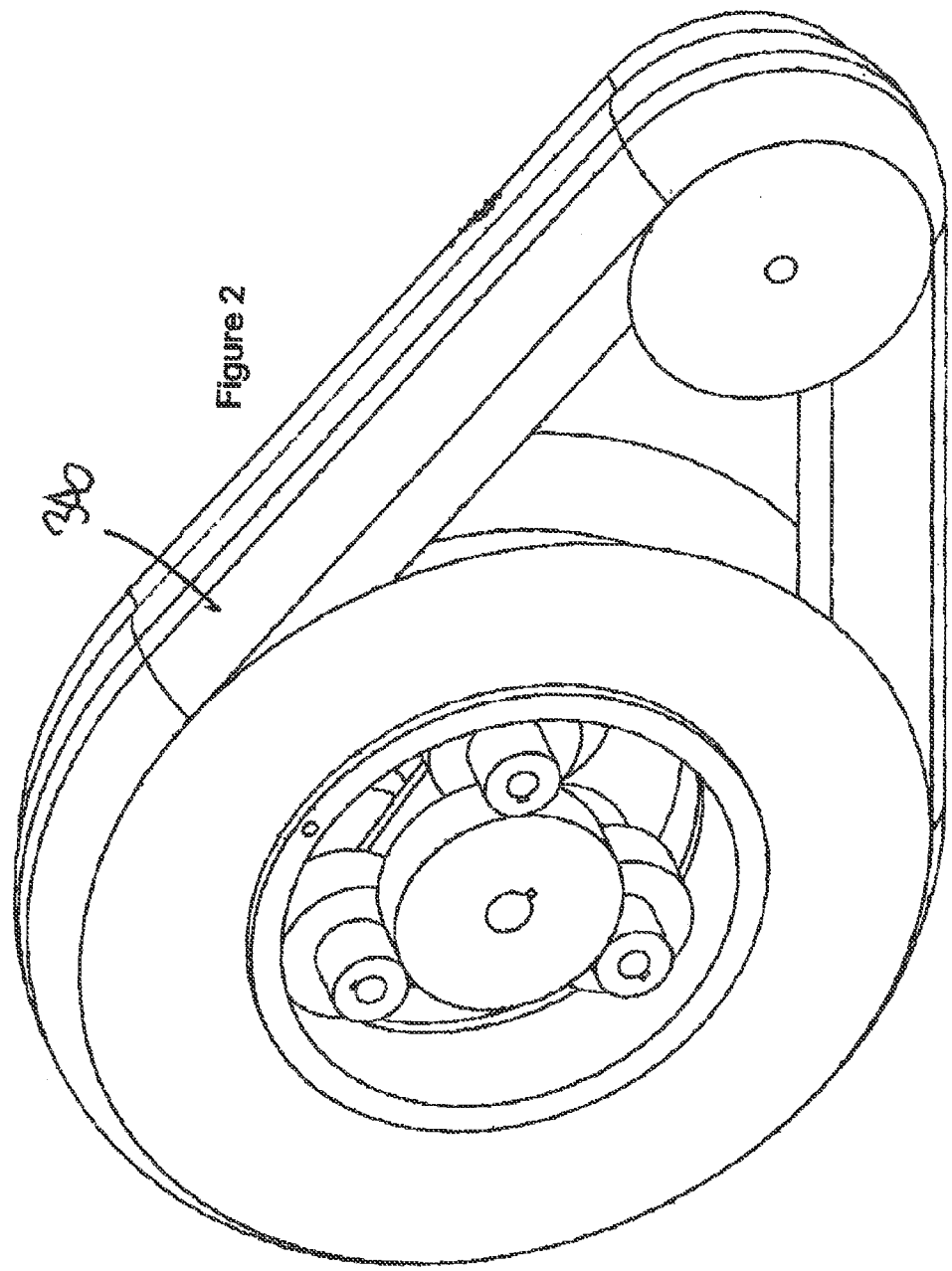
FIG. 2 is an isometric view of a step climbing mechanism showing a ground engaging tyre or belt, the mechanism disposed on a flat surface, the mechanism in accordance with a second embodiment of the present invention.

Another embodiment of the powered step climbing wheel is shown in FIG. 2. The gearbox provided in this embodiment is a variation of a standard two stage planetary gearbox. A first stage includes a first gear forming the sun gear, second gears forming the planets, and an outer ring forming an annular gear. In this arrangement a spider is provided which also acts as the sun gear for a second stage. A third set of gears disposed adjacent the first stage are provided which are in the form of planet gears and a solid ring acts as an annular gear of the second stage and is fixed to the wheelchair frame. A wheel arm is provided which forms the spider for the second stage and is the output of the gearbox. The tyre will be connected to the annular gear of the first stage.

The first stage annular gear is fixed to the wheelchair (using a brake) and the wheel arm then rotates with respect to the input with a ratio of between 4:1 and 12:1 and the tyre will be fixed. When the first stage annular gear (and tyre) are released and the first stage spider is fixed instead then the wheel arm will remain fixed and the annular gear and tyre will rotate with a ratio of −1:1 (same speed but opposite direction). Which means that the wheelchair will drive at the same speed as normal.

This gear arrangement is advantageous in that the same result can be achieved as using two clutches and two brakes to isolate and engage the wheel arm and tyre but only requires two brakes.

Figure 1:
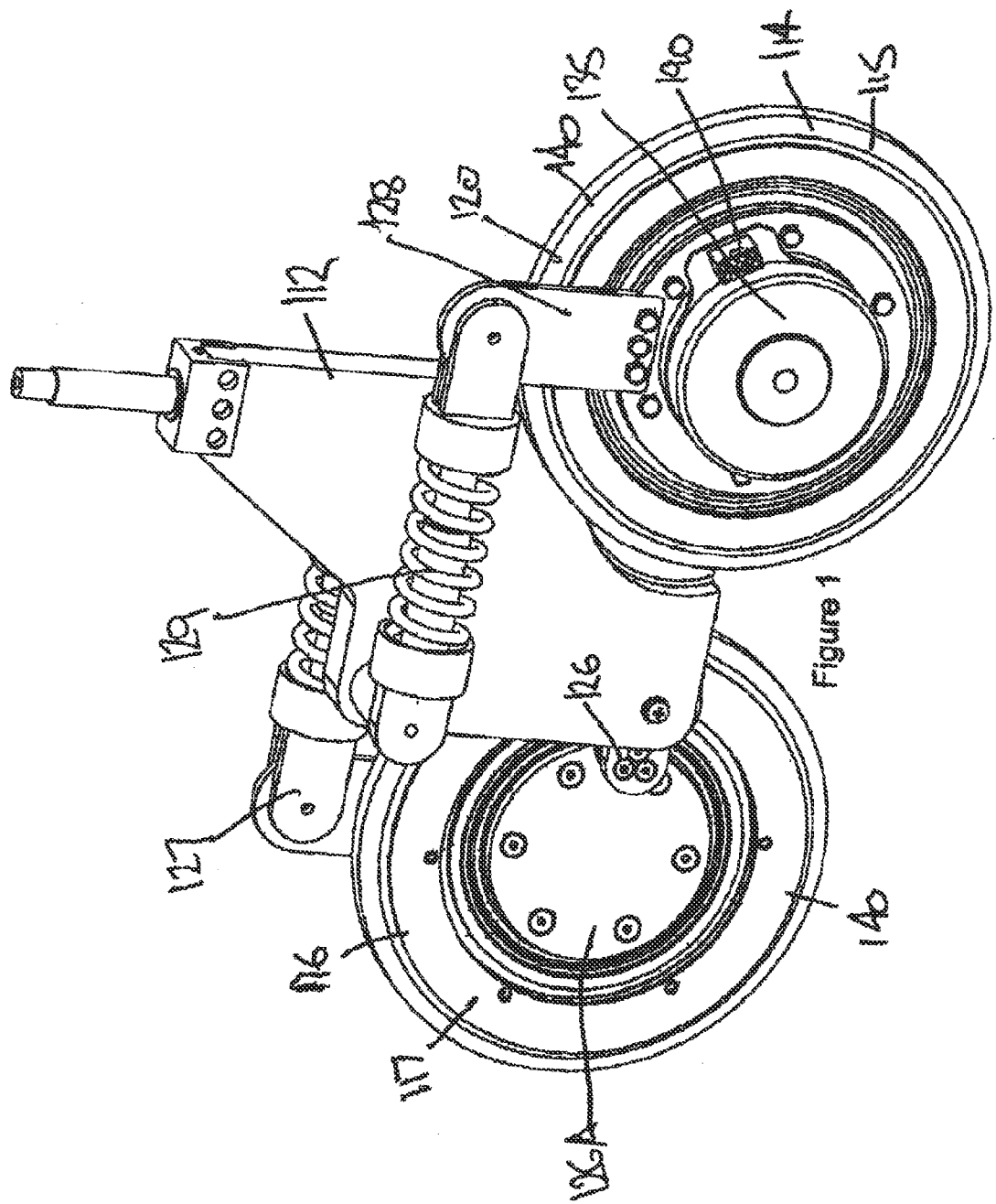
FIG. 1 is an isometric view of a step climbing attachment for use with a wheeled chair or other wheeled or moving item, the step climbing attachment disposed on a flat surface in accordance with a first embodiment of the present invention.

In operation, the embodiments of FIG. 1, FIGS. 5-9 and 12-15 act as set out below. The attachment 10 negotiates steps as follows: FIG. 1 shows the attachment 10 approaching or abutting a step 5. The first and second ground engaging wheel assemblies are disposed side by side.

Figure 6:
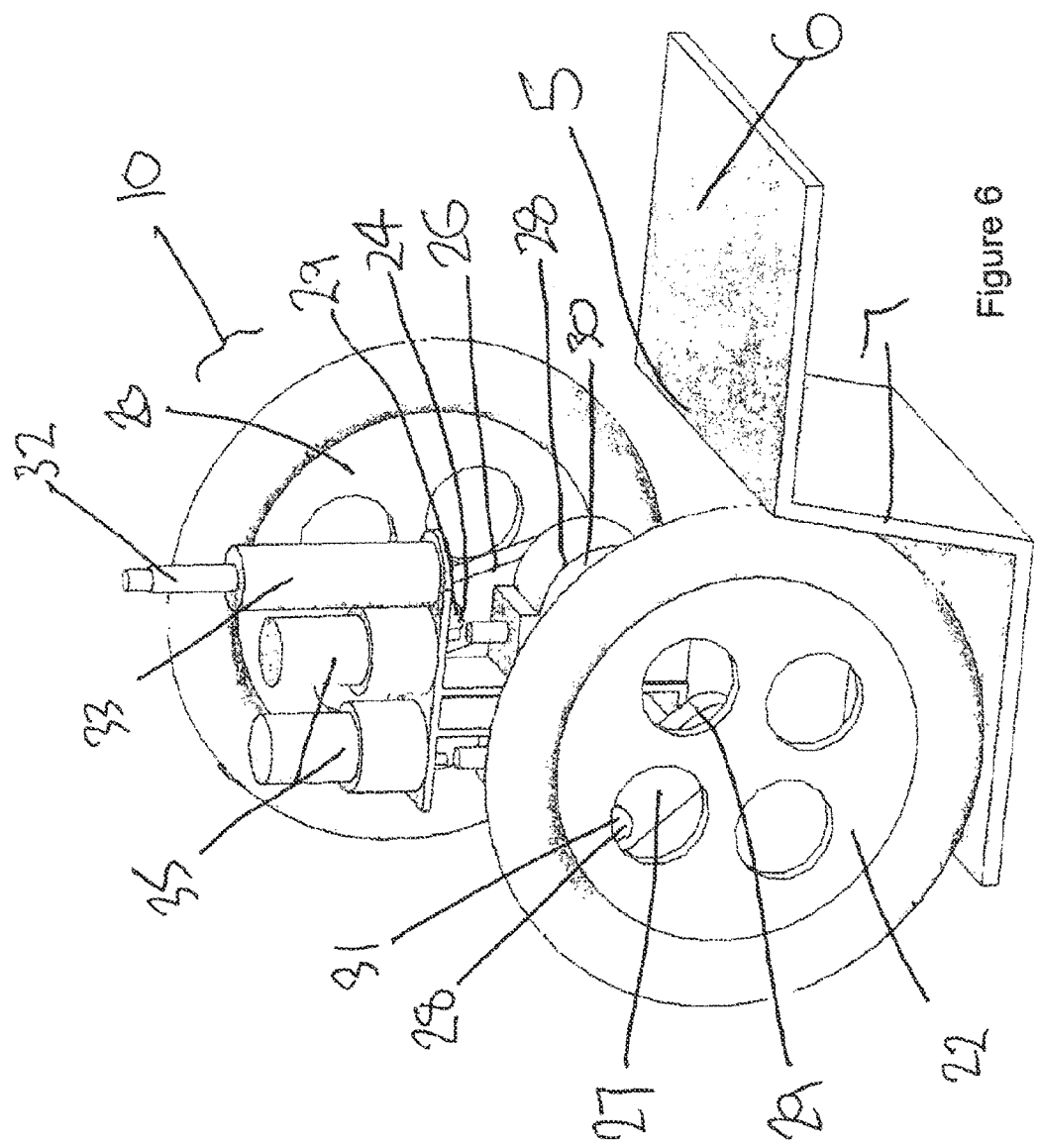
FIG. 6 is an isometric view of the step climbing attachment of FIG. 5 disposed in a position having a first wheel elevated and ready for extension into a step engaging position, and a chassis being elevated above a second wheel.

Then, as shown in FIG. 6, the attachment 10 responds to an input from an operator or other sensor or controller to move the attachment into a step-engaging position by rotating both the link arms 26, 27 (or linkages) under power. Movement of a second wheel arm elevates the chassis 12 and movement of the first wheel assembly 15 places the first wheel onto a step tread 6. It is of course possible that only one link arm needs to rotate to place the wheel 20 onto the tread or into the step- (or tread-) engaging position, but it will depend on the height of the riser 7.

Figure 7:
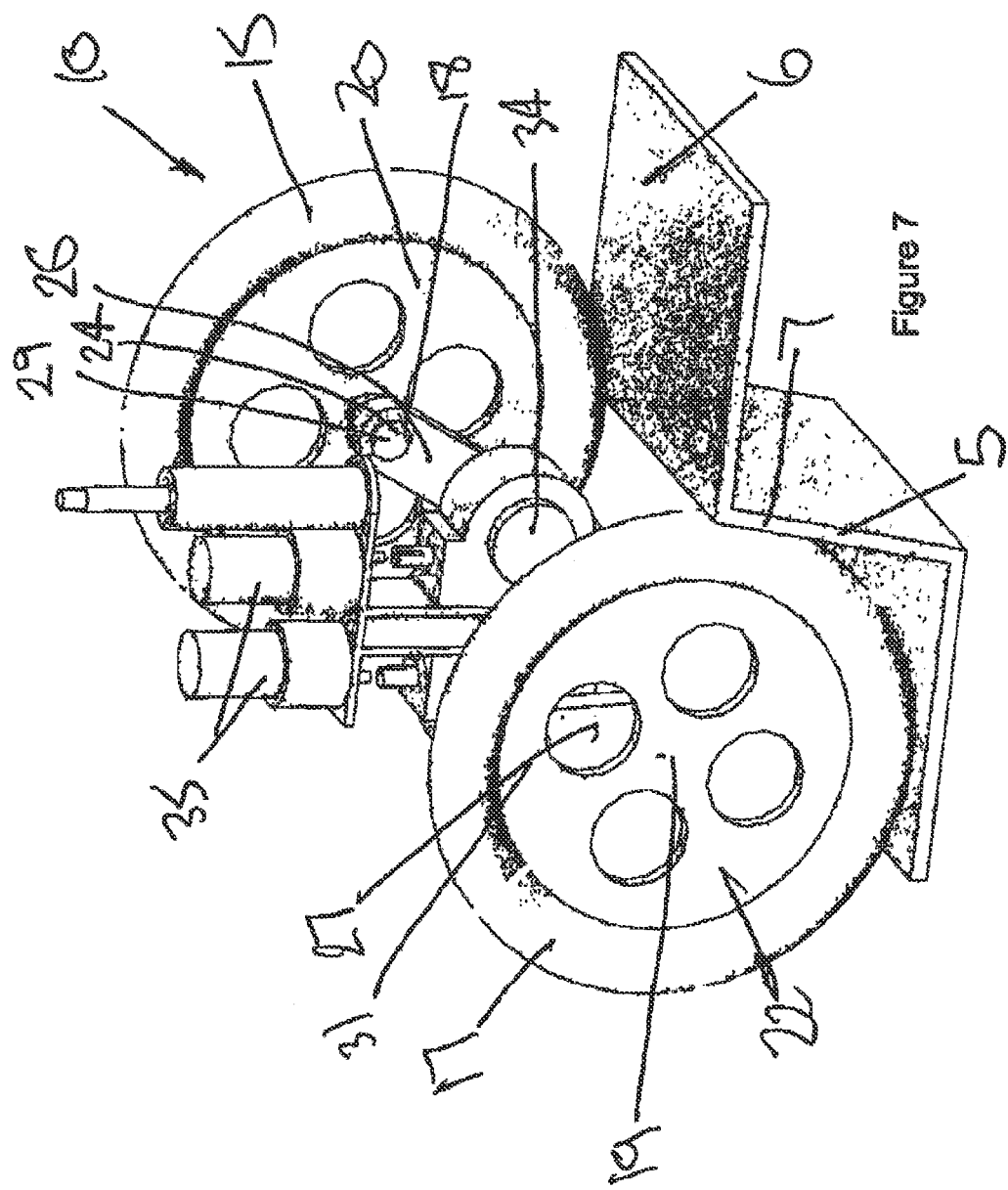
FIG. 7 is an isometric view of the step climbing attachment of FIG. 5, the first wheel in a step engaging position.
Figure 8:
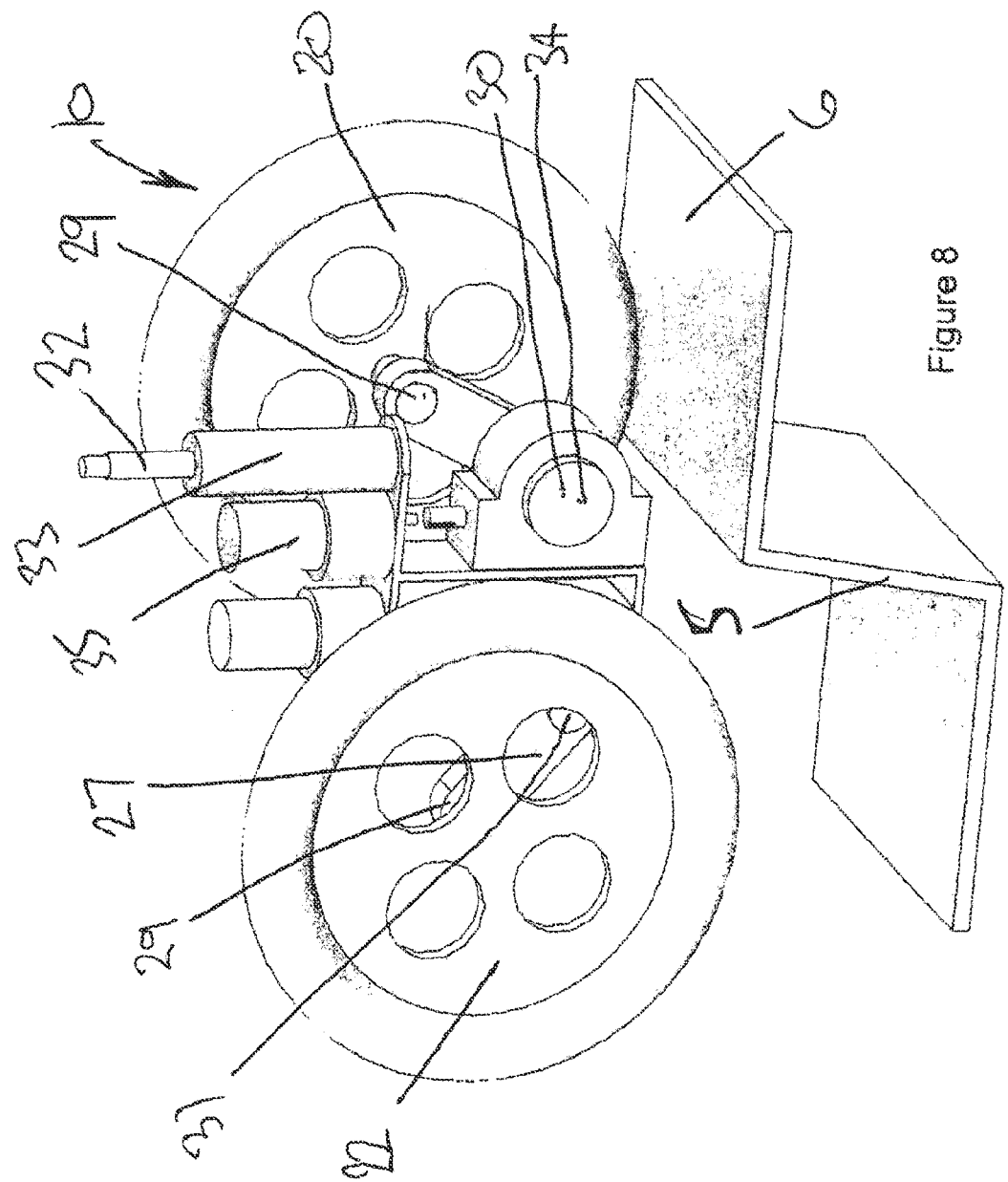
FIG. 8 is an isometric view of the step climbing attachment of FIG. 5, the second wheel being drawn up off the ground and ready to be drawn into a step engaging position.

The next step is shown in FIG. 7 in that it is shown that the link arm 27 is in a vertical position, which causes the chassis 12 to be elevated to its highest possible relative position, and the other link arm 26 is extending up and forward so that the wheel 15 engages the tread 6. The wheel 22 is then lifted off (FIG. 8) from its ground engaging position so as to clear the riser 7. The wheeled chair may then, as shown in FIG. 9, be pushed or powered so as to move the chair up the step.

Usually the front wheels are simply passive castors and the rear wheels of the wheelchair are powered and have the embodiment shown in FIGS. 2 and 10-11, and the powered wheels will push the wheeled chair and the front castors up the step. When the wheeled chair's rear wheels 220 and 222 meet the step, the powered rear wheels negotiate the step by using the planetary drive arrangement 280.

Figure 17:
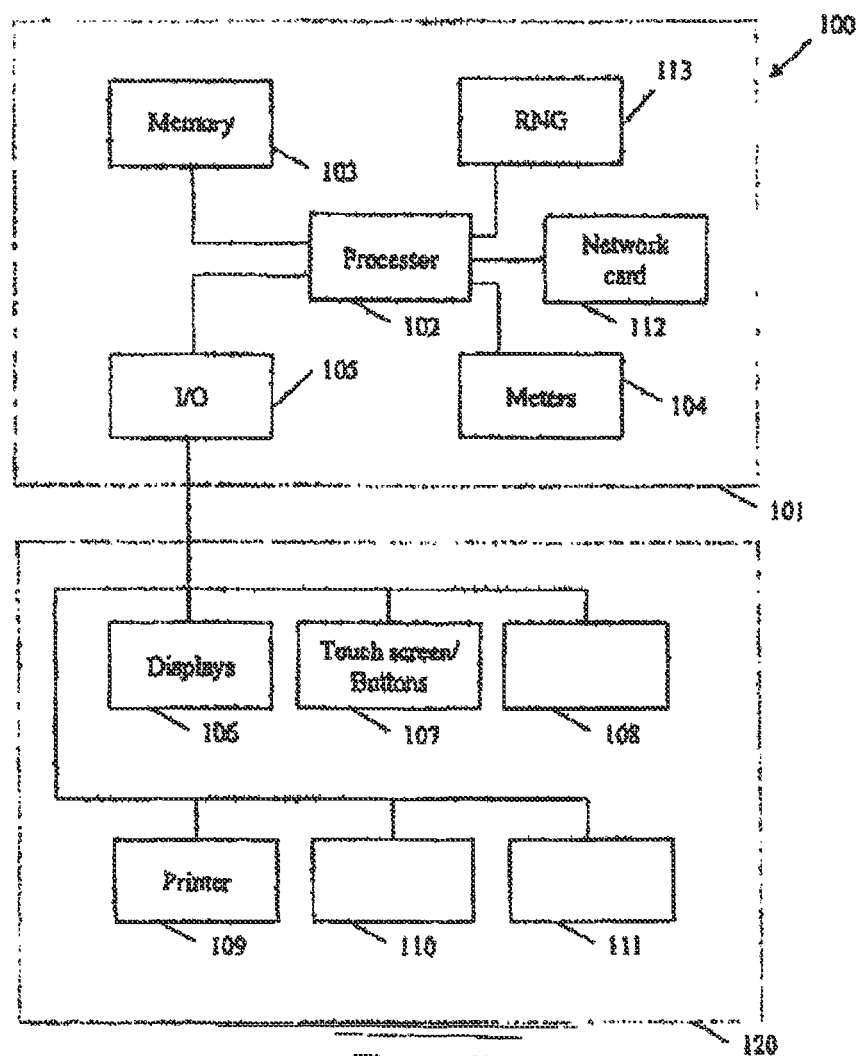
FIG. 17 is a schematic view of control system architecture for implementing example step climbing methods used with embodiments of the present invention.
Figure 18:
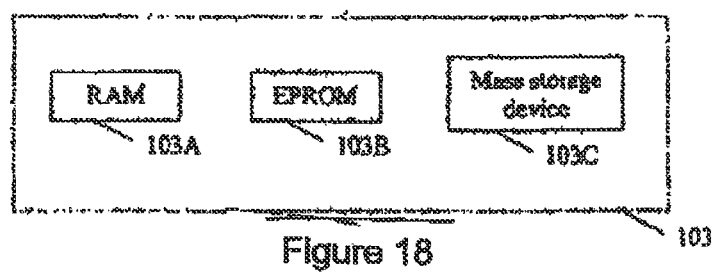
FIG. 18 is another schematic view of control system components.
Figure 19:
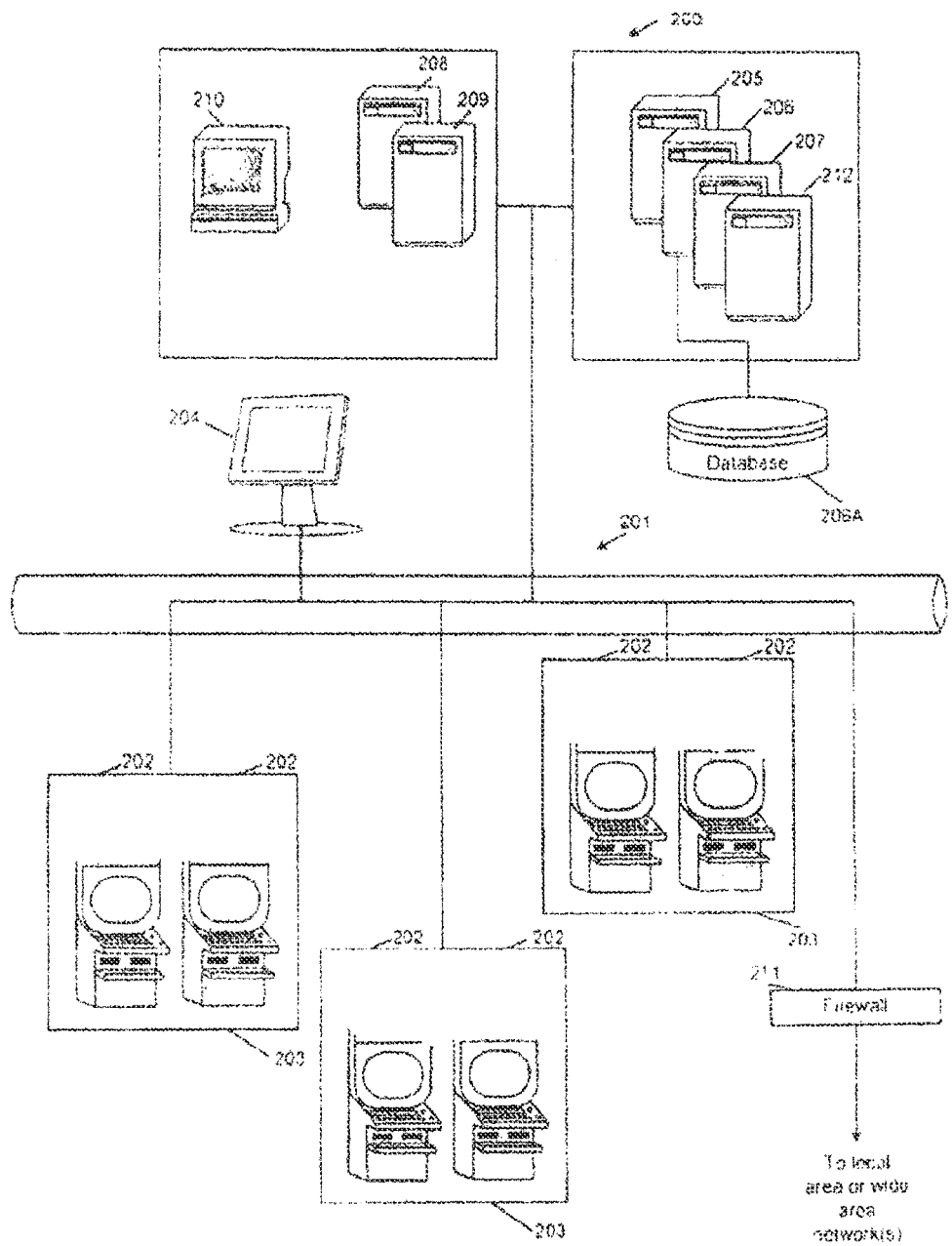
FIG. 19 is a schematic of control system components.

The operation of the system is controlled by the controller, a block diagram of operative components of which is shown at FIGS. 17, 18 and 19, the controller being indicated at 100. The controller of preferred embodiments of the present invention may be in the form of such a machine or smartphone or other computer, generally as hereinafter described.

The control system 100 includes a controller 101 having a processor 102. Instructions and data to control operation of the processor 102 in accordance with the present invention are stored in a memory 103 which is in data communication with the processor 102.

Typically, the control system 100 will include both volatile and non-volatile memory and more than one of each type of memory, with such memories being collectively represented by the memory 103.

FIG. 18 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or control related code. The mass storage device 103C is typically used to store control programs, the integrity of which may be verified and/or authenticated by the processor 102 using protected code from the EPROM 103B or elsewhere.

The control system has an input/output (I/O) connection 105 for communicating with a display interface 120, the display interface 120 having several peripheral devices. The input/output interface 105 and/or the peripheral devices may be intelligent devices with their own memory for storing associated instructions and data for use with the input/output interface or the peripheral devices.

In the example shown in FIG. 17, the peripheral devices that communicate with the controller 101 comprise one or more sensors and/or actuators and/or displays 106, a touch screen and/or bank of buttons 107; a printer 109. Additional hardware may be included as part of the control system 100, or hardware may be omitted as required for the specific implementation.

In addition, the control system 100 may include a communications interface, for example a network card 112. The network card may, for example, send status information, accounting information or other information to a central controller, server or database and receive data or commands from the central controller, server or database.

It is also possible for the operative components of the control system 100 to be distributed, for example input/output devices 106, 107, 108, 109, 110, 111 may be provided remotely from the controller 101.

FIG. 19 shows a control system 200 in accordance with an alternative embodiment. The control system 200 includes a network 201, which for example may be an Ethernet network, a LAN or a WAN. In this example, three banks 203 of two controllers 202 are connected to the network 201. The control systems 202 provide a user interface and may be the same as the control systems 100 shown in FIGS. 17 and 18, or may have simplified functionality depending on the requirements for implementing control. While banks 203 of two controllers are illustrated in FIG. 19, banks of one, three or more control systems are also envisaged.

One or more actuators 204 may also be connected to the network 201. The actuators 204 may, for example, be associated with one or more banks 203 of control systems. The actuators 204 may be used to implement outcomes associated with control situations associated with the control systems 202.

In a thick client embodiment, a control server 205 implements part of the control system using a control machine 202 and the control machine 202 implements part of the control algorithm. With this embodiment, as both the control server 205 and the control machine 202 implement part of the control algorithm, they collectively provide a controller. A database management server 206 may manage storage of control programs and associated data for downloading or access by the control devices 202 in a database 206A.

In a variation of the above thick client embodiment, the control machine 202 may implement the control, with the control server 205 functioning merely to serve data indicative of a control algorithm to the control machine 202 for implementation.

With this implementation, a data signal containing a computer program usable by the client terminal to implement the control system may be transferred from the control server to the client terminal, for example in response to a request by the client terminal.

In a thin client embodiment, the control server 205 implements most or all of the control using a control machine 202 and the control machine 202 essentially provides only the control interface. With this embodiment, the control server 205 provides the controller. The control machine will receive control instructions, and pass the instructions to the control server which will process them and return control outcomes to the actuators for implementation. In a thin client embodiment, the control machines could be computer terminals, e.g. PCs running software that provides a player interface operable using standard computer input and output components.

It will be appreciated that support attachments in accordance with the preferred embodiments of the invention are suitable for being incorporated with powered wheelchairs and in that case, the support attachments can be used with rear-wheel-drive wheelchairs such as for example those described in the above paragraph, or with front-wheel-drive wheelchairs or mid-wheel drive wheelchairs, the latter of which typically have two sets of castor wheels respectively toward the front and back of the wheelchair on either side of the drive wheels.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A step-climbing attachment for a wheeled chair, the attachment including:
   a wheel-mounting chassis for mounting wheels;
   a first wheel and a second wheel mounted on the wheel-mounting chassis for rotation about their axes;
   the first and second wheels each being adapted to move relative to the other, the relative movement in use being between a ground engaging position and a step-engaging position so that in use at least one of the first or second wheels engages a step; and
   respective link arms connected to the chassis so as to mount the first wheel and the second wheel to the chassis and allow each wheel to independently swing from the ground engaging position to the step-engaging position;

at least one of the first and second wheels having a hub and said at least one of the first and second wheels having a motor and gearbox mounted within the hub, said motor and gearbox being connected to the respective link arms so as to pivot the other of the first and second wheels into a step engaging position.

2. The step-climbing attachment in accordance with claim 1 wherein the attachment is mounted to a stub axle on a wheel chair so that the wheel-mounting chassis pivots thereabout.

3. The step-climbing attachment in accordance with claim 1 wherein the link arms are linked so as to form a four bar linkage.

4. The step-climbing attachment in accordance with claim 3 wherein the four bar linkage is arranged so that first and second links of the four bar linkage are pivotally mounted at spaced-apart locations on the wheel-mounting chassis and are connected at their distal ends by a connecting arm.

5. The step-climbing attachment in accordance with claim 4 wherein at least one link includes a spring and/or damper arrangement to provide an at least partially suspended chassis.

6. The step-climbing attachment in accordance with claim 3 wherein the hub connects to a distal end of the first link of the four-bar linkage.

7. The step-climbing attachment in accordance with claim 3 wherein a motor plate is provided and mounts to a distal end of the second link of the four-bar linkage.

8. The step-climbing attachment in accordance with claim 1 wherein one of the first or second wheels is disposed in use on the chassis in a position relatively forward of the other of the first or second wheels so as to facilitate step climbing or descending.

9. The step-climbing attachment in accordance with claim 8 wherein the chassis is disposed between first and second wheels.

10. The step-climbing attachment in accordance with claim 1 wherein the first wheel is a powered wheel assembly to provide propulsion to the chassis.

11. The step-climbing attachment in accordance with claim 10 wherein the second wheel is in the form of a planetary wheel assembly and is mounted so as to orbit the first powered wheel assembly.

12. The step-climbing attachment in accordance with claim 11 wherein an idler wheel is provided and is disposed to be in contact with the tread of the first wheel, and in operation is disposed between the first and second wheels.

13. The step-climbing attachment in accordance with claim 11 wherein two planetary wheels are provided.

14. The step-climbing attachment in accordance with claim 13 wherein a differential or belt system is used so that a drive motor may be used for propulsion and climbing.

15. The step-climbing attachment in accordance with claim 14 wherein a two stage planetary gearbox is provided with a third stage reduction so as to isolate and engage a wheel arm to cause the movement of the planetary wheel into a step-engaging position.

16. A self-propelled wheeled chair including a step-climbing attachment according to claim 1.

* * * * *